United States Patent

[11] 3,619,658

[72] Inventor Ralph A. Prunty
Anamosa, Iowa
[21] Appl. No. 833,984
[22] Filed June 17, 1969
[45] Patented Nov. 9, 1971
[73] Assignee Collins Radio Company
Cedar Rapids, Iowa

[54] GATE CONTROLLED SWITCH EMPLOYING TRANSISTORS

2 Claims, 1 Drawing Fig.

[52] U.S. Cl. .......... 307/255,
307/252.51, 307/288, 307/313, 323/4, 323/22 T
[51] Int. Cl. .......... H03k 17/00
[50] Field of Search .......... 307/252.51,
255, 288, 313; 323/4, 22 T

[56] References Cited

UNITED STATES PATENTS

| | | | |
|---|---|---|---|
| 3,121,802 | 2/1964 | Palmer | 307/288 |
| 3,313,985 | 4/1967 | White | 307/288 X |
| 3,376,516 | 4/1968 | Budts | 307/255 X |
| 3,390,306 | 6/1968 | White | 307/313 X |
| 3,463,937 | 8/1969 | Taylor | 307/228 |
| 3,466,469 | 9/1969 | Brown | 307/255 X |
| 3,512,047 | 5/1970 | Garde | 323/4 X |
| 3,353,091 | 11/1967 | Matsumoto | 307/230 X |
| 3,435,257 | 3/1969 | Lawrie, Jr. | 307/289 |

OTHER REFERENCES

Williams, " Low-Voltage Level Sensing Circuit," Electronic Engineering, Vol. 40, Number 487, Sept. 1968, (pp. 517-520), Sui. Lib. Tk6630. AZTZ Williams, " Low-Voltage Ring-of-Two Reference," Electronic Engineering, Vol. 39, Number 477, Nov. 1967 (pp. 676-680), Sui Lib. TK 6630 AZTZ

*Primary Examiner*—Donald D. Forrer
*Assistant Examiner*—A. C Woodbridge
*Attorneys*—Robert J. Crawford and Bruce C. Lutz

ABSTRACT: A power transistor is connected in series with diode means, DC source means, and utilization means, with the diode means having its forward impedance presented to current flow through the transistor. A control transistor is connected in series with a current limiting resistor, said DC source and said utilization means. The collector of each transistor is connected to the base of the other to form a feedback loop. Said diode means is connected to provide a constant voltage across the series arrangement of the resistor and the emitter-base electrode circuit of the control transistor, thereby limiting the current through the control transistor. A pulse of proper polarity applied to the collector of the control transistor will divert the collector current thereof from the base of the power transistor, thereby interrupting the feedback loop and turning off the circuit. A pulse of opposite polarity will turn on the circuit.

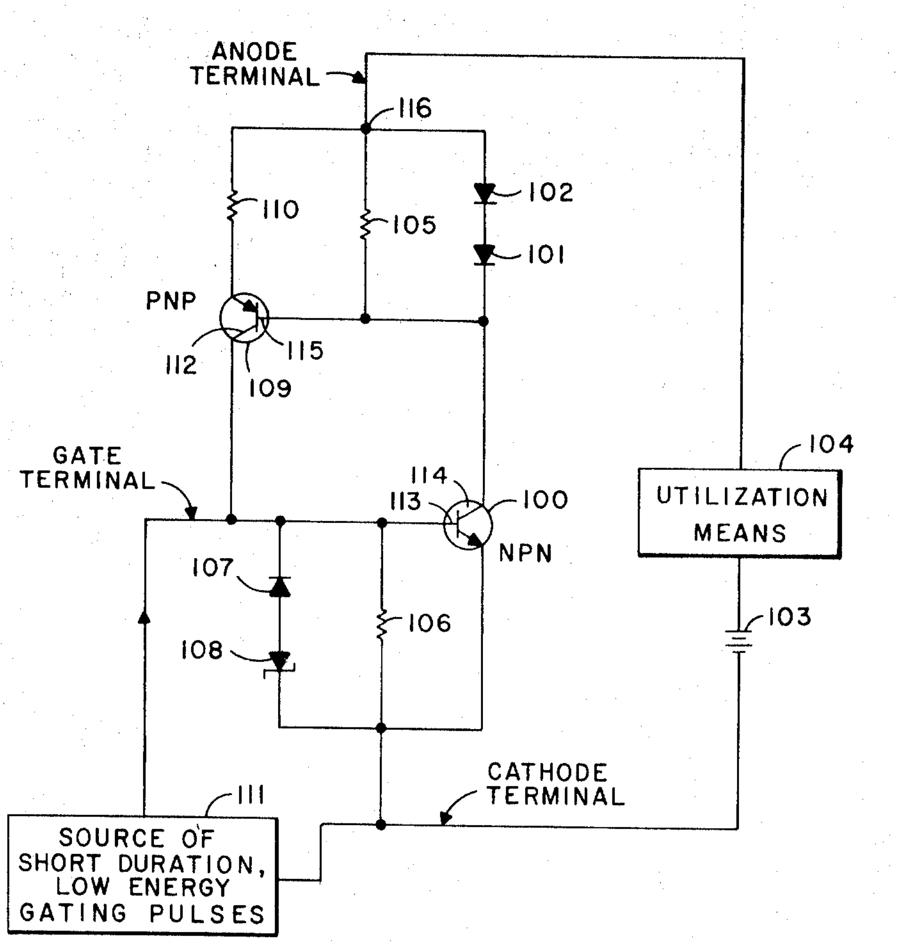
INVENTOR.
RALPH A. PRUNTY
BY Donald W. Phillion
ATTORNEY

GATE CONTROLLED SWITCH EMPLOYING TRANSISTORS

This invention relates generally to gate-controlled switches and more particularly to a gate-control switch employing transistors.

There are in the prior art at least two general groups of gate-controlled switches employing semiconductors. One of these groups include silicon controlled rectifiers (thyristors) and the second group includes arrangements of a bistable device comprised of a pair of transistors which in turn control an amplifier which can comprise one or more transistors capable of handling predetermined power requirements.

While SCR devices can be turned on with a small duration, small energy pulse, they cannot be turned off by a similar pulse. The difficulty incurred in turning off an SCR stems primarily from its geometry. An SCR device is basically a four layer NPNP type semiconductor device consisting of consecutive layers of N material, P material material, N material and P material. Each of these layers is large in cross sectional area and very small in thickness so that the resultant SCR might have the shape of a thin, flat disc. The gating on of an SCR is frequently accomplished by an input gage lead which is connected to the P layer immediately underneath the external N layer; a small portion of the N layer having been removed to form an exposed area of the underlying P layer. A gating current supplied to the input gate lead will function to produce carriers in said P layer immediately adjacent the point where said gate lead is connected, and will cause conduction in the SCR in this small area. Such conduction will spread rapidly throughout the entire SCR. It is, however, not possible to turn off the SCR by applying a pulse of the opposite polarity to the input gating lead since such turnoff pulse only affects that small area immediately surrounding the connection of the gating lead to the P layer. In order to turn off the SCR it is necessary to either open circuit the main anode cathode circuit or to momentarily reverse the current therein.

The other class of power switches mentioned above has the disadvantage of requiring at least three transistors. More specifically two transistors are required in the bistable device which controls the third power transistor.

It is a primary object of the present invention to provide a power switching device which can be turned on and turned off by a short duration, small energy pulse and which employs only two transistors.

A second purpose of the invention is a power switching device employing only two transistors, interconnected in such a way that one of said transistors will conduct a relatively large amount of power, with the conductivity thereof being determined by the other transistor, which can be turned on and off with short-duration, low energy input pulses.

A third aim of the invention is an inexpensive, simple and reliable transistorized power or logic level switching device operable to an on or off position by means of short-duration, low-energy pulses.

A fourth object of the invention is the improvement of transistorized power switches generally.

In accordance with the invention there is provided a first series arrangement of a diode means and an NPN-type transistor connected across a DC source, with the diode means representing its forward impedance to the current flow through said transistor. A second series arrangement of a resistive means and a PNP-type transistor is also connected across said DC source. The collector of each transistor is connected to the base of the other transistor to provide a feedback loop around the base-collector circuits, with a resultant maximum current flow in each transistor once conduction is initiated. Said resistor is connected in parallel with said diode means with respect to said DC source so that the voltage across said resistor remains constant when the circuit is conductive. Consequently the current through said resistor, and also through said second transistor, remains constant and in fact is limited by the value of said resistor to a sufficiently small value so that a short-duration, low-energy pulse supplied to the collector electrode of said PNP-transistor will divert said collector current from the base of the NPN-transistor to cut off said NPN transistor. The turning off of the NPN power transistor will in turn cut off the PNP transistor thus completely turning off the switching circuit with a short-duration, low-energy pulse insertion. Another such pulse of opposite polarity will initiate a base current in the NPN power transistor, to cause a collector current therein and a resultant base current in the PNP transistor, thus initiating operation of both transistors which rapidly develops maximum currents in both transistors.

In accordance with a feature of the invention the switching circuit can be turned off merely by grounding the collector of the PNP-transistor transistor (and also the base of the NPN transistor) to the emitter of the NPN transistor, thus eliminating the need for the gating source to supply both positive and negative gating pulses. Only pulses to turn on the circuit are needed.

In accordance with another feature of the invention it is to be specifically noted that the collector current in the PNP-transistor is limited to a rather low value by means of said resistor in series therewith and the diode connected in parallel with said resistor. The voltage across the diode, when the circuit is conductive remains substantially constant regardless of the current therethrough. Consequently the voltage across the resistor and the current therethrough are also constant. Substantially all the current flowing through utilization means flows through the collector-emitter circuit of the NPN power transistor and only a small amount flows out of the collector of the PNP transistor.

The above-mentioned and other objects and features of the invention will be more fully understood from the following detailed description thereof when read in conjunction with the drawing which shows the schematic sketch of the invention.

In the FIGURE a first transistor 100 of the NPN-type is connected in series with a pair of diodes 101 and 102, DC battery source 103, and utilization means 104. When the circuit is in its on-state (conductive state), the aforementioned circuit, including transistor 100, comprises the path for substantially all of the current flow.

The remainder of the current flow passes through a second series circuit including resistor 110, PNP-type transistor 109, and resistor 106, which as can be seen from the FIGURE, is connected in series arrangement with battery source 103 and utilization means 104.

A third current path, which is essential to the operation of the device, can be traced from the collector electrode 112 of transistor 109 through the base 113-collector electrode 114 of transistor 100 and back to the collector 112 of transistor 109 through base 115 thereof. It is this last-mentioned circuit which provides a feedback path through the base-collector circuits of the two transistors to control the conductivity thereof to either an off-state, or to an on-state, depending upon the polarity or condition of the gating pulse from gate pulse source 111.

For purposes of description three terminals of the circuit can be labeled as an anode, a cathode, and a gate, as shown in the drawing. More specifically the cathode terminal is connected to the emitter of transistor 100, the gate terminal to the base of transistor 100, and the anode terminal to the junction 116.

The functions of resistors 106 and 105 are to provide current leakage paths for transistors 109 and 100, respectively, when in their off condition. A second function of resistor 105 and 106 is as follows. When the circuit is in its off-state, resistors 105 and 106 provide an impedance which prevents the accidental triggering of 106 the circuit (transistors 109 and 100), into the on-state. Diode 107 is an asymmetrical impedance protective device which protects the potential of base 113 of transistor 100 from excessive negative biasing when transistor 100 is turned off because the apparent impedance changes with polarity of voltage applied. If desired, a Zener diode 108 can be placed in series with diode 107 across the basė-emitter circuit of transistor 100 to allow for larger negative bias on the base 113, thus causing a somewhat faster switch-off time than would be accomplished with the use of diode 107. If the voltage drop across diode 107 is to determine the limiting negative bias on base 113, then Zener diode 108 would not be used.

The diodes 102 and 101 constitute an important element of the invention. Basically, the two diodes 101 and 102 are provided to establish a constant voltage across resistor 110 in the emitter circuit of transistor 109. By establishing such constant voltage across resistor 110 there is established a constant current therethrough, and consequently a constant current through transistor 109. Resistor 110 is made sufficiently large so that this constant current is small enough to be easily diverted by a pulse of proper polarity from the gating pulse source 111. This establishes an absolute maximum limit on the gate current ($I_{GTO}$) required to turn off the circuit.

It will be noted that there are two diodes, 101 and 102, in parallel with the series arrangement of resistor 110 and the emitter-to-base electrode circuit of transistor 109. The need for two diodes is as follows. One of the two diodes is required to balance the voltage drop across the emitter-to-base electrodes of transistor 109 and the other diode is employed to establish the voltage drop across resistor 110. One diode would suffice in lieu of the two diodes 101 and 102 if the voltage drop thereacross were sufficiently large to compensate for both the emitter-base electrode drop of transistor 109 and the desired voltage drop across resistor 110. However, the characteristic of the diffused silicon diode is similar to that of the emitter-to-base electrode circuit of a diffused silicon transistor so that two diodes are required in the present invention.

Other arrangements that will allow the use of one diode in place of 101 and 102 are:

1. Use a diffused silicon diode and a germanium PNP transistor.
2. Use a diffused silicon diode and a metal-base silicon PNP transistor.

The operation of the device is as follows. Assume the circuit to be in an off condition with both transistors 109 and 100 nonconductive. Assume further that a short-duration, low-energy gating pulse is supplied from gating source pulse 111 to the base 113 of transistor 100. Such a pulse will cause a small collector current to flow in transistor 100. This small collector current will create a small base current in transistor 109 which in turn will initiate a collector current in transistor 109. The collector current in transistor 109 is supplied to the base 113 of transistor 100 and will reinforce the original gating pulse supplied thereto to increase further the collector current in transistor 100, which in turn increases the base current in transistor 109. The process is regenerative and both transistors 109 and 100 assume a condition of maximum collector current very rapidly.

The maximum emitter-collector current through transistor 109 is limited, however, by the value of resistor 110 and the voltage thereacross, which in turn is determined by the constant voltage drop across the two diodes 101 and 102, now conductive by virtue of transistor 100 becoming conductive and the voltage across diodes 101 and 102 increasing very quickly to the quiescent forward voltage drop thereof.

To turn off the device a pulse of negative polarity is supplied from gating source 111. Such pulse functions to divert a portion of the collector current from transistor 109 away from the base 113 of transistor 100. When this pulse reaches a critical magnitude, there will be a reduction of the collector current of transistor 100. Due to the impedance of the forward biased diodes, here will be a slight decrease in the voltage across resistor 110. Thus the collector current of transistor 109 is reduced so that a regenerative process is established and the off-state will be reached very rapidly. For any anode current, the magnitude of the required gate turn off pulse is bounded by the magnitude of the collector current of transistor 109.

When both transistors 109 and 100 are in a nonconductive state, the circuit is switched off and will remain so until another turn on pulse is supplied from gate pulse source 111.

It is to be noted that to switch off the circuit it is necessary that the gating pulse from source 111 be of sufficient magnitude to momentarily divert a substantial portion of the collector current of transistor 109 from base 113 of transistor 100 and thus initiate the decrease of collector current in transistor 100 towards zero.

When in an on condition, the main current flow is from battery source 103, through utilization means 104, the two diodes 102 and 101, the collector-emitter circuit of transistor 100, and back to the DC source 103.

The magnitude of the current passing through transistor 100 and utilization means 104, and the magnitude of the DC voltage source 103 determines the required characteristics of transistor 100. In the present state of the art there are transistors available which will conduct several hundred amperes or support an applied voltage across the collector-emitter electrodes of approximately 150 volts. As transistors are improved, the current carrying capacity and the permissible voltage applied thereacross will probably increase.

It is to be understood that the form of the invention shown and described herein is but a preferred embodiment thereof and that various changes can be made therein without departing from the spirit or the scope of the invention.

For example, the diodes and transistors referred to herein are of the "diffused silicon" type which is the most common type presently available. However, any of the following are generally interchangeable therewith.

1. Alloy grown junction silicon.
2. Epitaxial grown junction silicon.
3. Double or triple diffused silicon.
4. Epitaxial diffused silicon.

With suitable design changes almost any kind of inverting amplifying device can be used for the transistors and any passive device with similar nonlinear volt-ampere characteristic may be used in place of the diodes.

Another minor modification of the embodiment of the invention involves the replacing of resistor 106 with an inductor, with the result that the gate-controlled switch will turn itself off some predeterminable time after it is gated on.

Another modification which will reduce the switching-off loss of transistor 109 is the addition of a series inductor-resistor branch in parallel with resistor 105. The energy stored in the inductor during the on-state is useful in removing the stored charge from diodes 101 and 102 and from the base 115 of transistor 109. An additional diode connected from the base 115 of transistor 109 to the anode of the gate-controlled switch will be useful in preventing unwanted parasitic oscillations of this inductor with circuit capacitances. This diode must be connected with its cathode to the anode of the gate-controlled switch.

As an additional example of an alternative, it is possible to substitute an NPN-type type transistor for transistor 109 and a PNP transistor for transistor 100. Such a charge would require a reversal of the polarity of battery source 103 and also of diodes 101 and 102, assuming the collector electrode of each transistor to be connected to the base electrode of the other transistor.

I claim:

1. Switching circuit apparatus of the class described comprising input means, output means, and control means:

first and second opposite polarity transistor means each including first, second and third electrodes;

means connecting said first electrode of said first transistor means to said second electrode of said second transistor means;

means connecting said first electrode of said second transistor means to said second electrode of said first transistor means and to said control means;

first diode means connected between said input means and said first electrode of said first transistor means;

first impedance means connected between said input means and said third means of said second transistor means, the current flow through said impedance means being maintained at a substantially constant value by said diode means;

second diode means comprising at least two diodes at least one of which is a zener diode, said diode means being connected between said second electrode of said first transistor means and said third electrode of said first transistor means for limiting the reverse bias potential which may be supplied therebetween;

second impedance means connected in parallel with said second diode means; and means connecting said third means of said first transistor means to said output means, a pulse of a given polarity applied between said output means and said control means acting to activate said switch circuit apparatus and a pulse of a polarity opposite said given polarity supplied between said control and output means acting to deactivate said switch circuit apparatus.

2. Switching circuit apparatus of the class described comprising input means, output means, and control means;

first and second opposite polarity transistor means each including first, second and third electrodes;

means connecting said first electrode of said first transistor means to said second electrode of said second transistor means;

means connecting said first electrode of said second transistor means to said second electrode of said first transistor means and to said control means;

first diode means connected between said input means and said first electrode of said first transistor means;

first impedance means connected between said input means and said third means of said second transistor means, the current flow through said impedance means being maintained at a substantially constant value by said diode means;

second diode means comprising at least two diodes at least one of which is a zener diode, said diode means being connected between said second electrode of said first transistor means and said third electrode of said first transistor means for limiting the reverse bias potential which may be supplied therebetween;

second impedance means connected in parallel with said first diode means; and means connecting said third means of said first transistor means to said output means, a pulse of a given polarity applied between said output means and said control means acting to activate said switch circuit apparatus and a pulse of a polarity opposite said given polarity supplied between said control and output means acting to deactivate said switch circuit apparatus.

* * * * *